May 5, 1925.  1,536,704
F. H. CRAGO
TRAP
Filed May 10, 1924  2 Sheets-Sheet 1
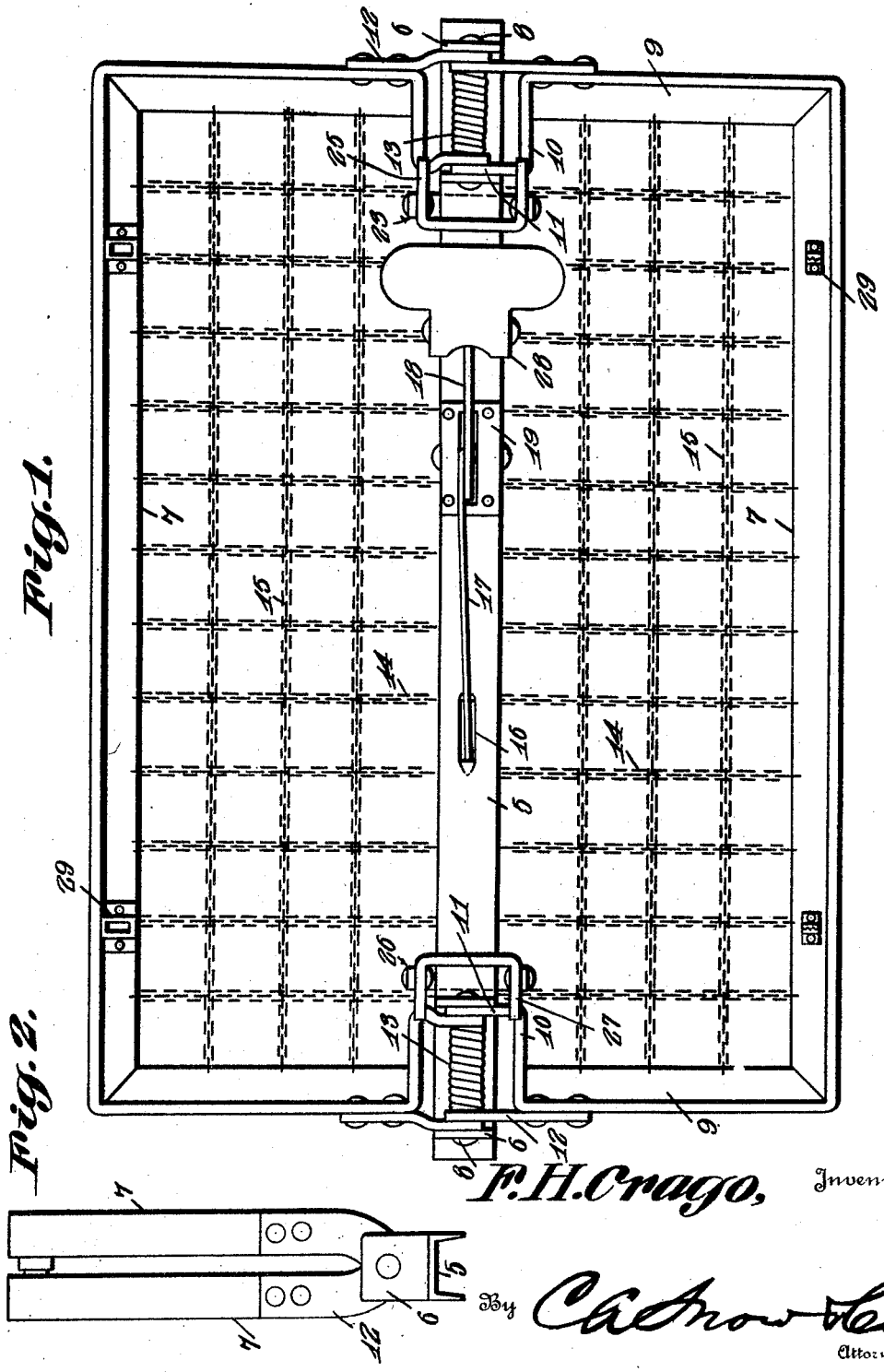

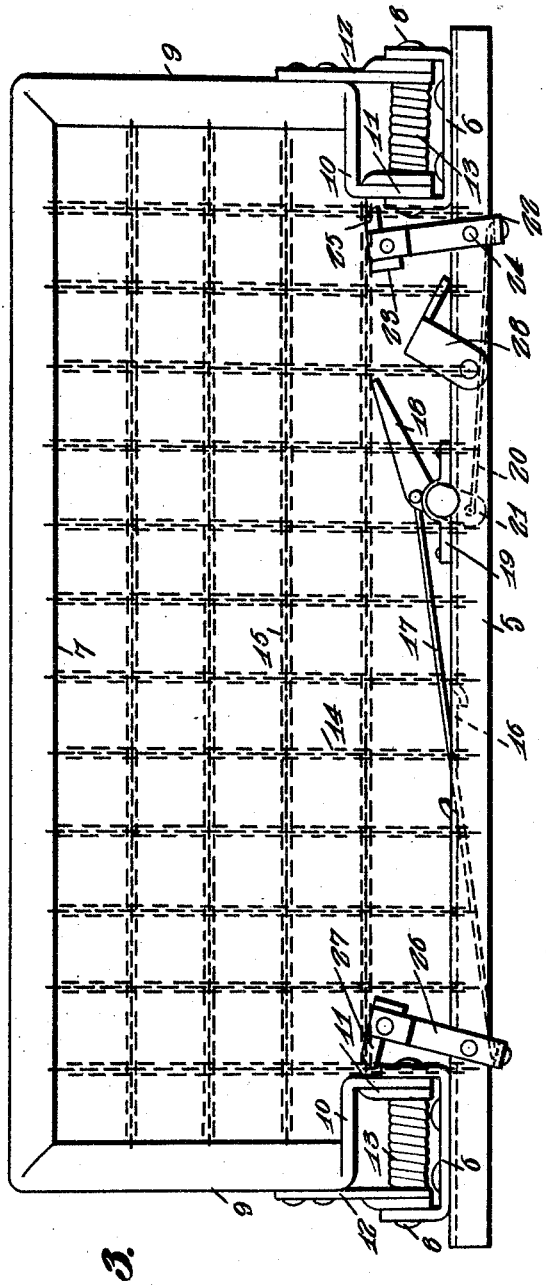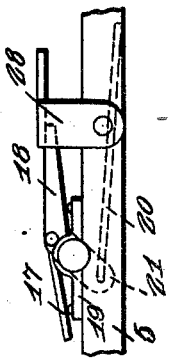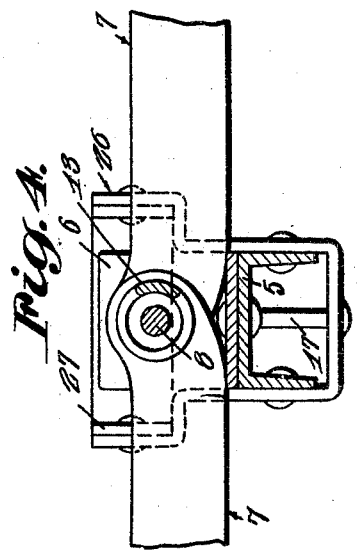

Patented May 5, 1925.

1,536,704

UNITED STATES PATENT OFFICE.

FELIX H. CRAGO, OF MILLTOWN, MONTANA.

TRAP.

Application filed May 10, 1924. Serial No. 712,362.

*To all whom it may concern:*

Be it known that I, FELIX H. CRAGO, a citizen of the United States, residing at Milltown, in the county of Missoula and State of Montana, have invented a new and useful Trap, of which the following is a specification.

This invention relates to animal traps, and aims to provide a novel form of trap wherein the animal caught will not be injured by the jaws of the trap.

Another important object of the invention is to provide a structure of this character which is exceptionally sensitive to insure the operation of the jaws if the trigger mechanism of the trap is touched by the animal.

A still further object of the invention is to provide means for holding the trap in its locked position when the jaws have been moved to their active positions.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawings:

Figure 1 is a plan view of the trap in a set position.

Figure 2 is an end view thereof showing the jaws of the trap in their active positions.

Figure 3 is a side elevational view of the trap in its active position.

Figure 4 is a sectional detail view disclosing the connection between the jaws and supporting bar.

Figure 5 is a fragmental detail view disclosing the latch mechanism for controlling the jaws.

Referring to the drawings in detail, the trap includes a base 5 formed preferably of channel iron inverted to support the base 5 in spaced relation with the surface on which the trap is positioned.

At each end of the base 5 is a U-shaped supporting member 6 which provides a bearing for the jaws 7 which are shown as supported on the bolts 8 that extends through the U-shaped members and end sections of the jaws.

Each of the jaws includes a rectangular section formed preferably of angle iron so that the jaws will be exceptionally strong and will not bend under the force of an animal trying to release himself. The end sections 9 of the jaws have inwardly extended portions 10 and angular portions 11 which are formed with openings to accommodate the bolt 8 associated therewith. Secured to the end sections 9 are bars 12 which are also formed with openings to receive the bolts 8 to allow the jaws of the trap to swing freely.

Coiled springs 13 are positioned around the bolts and have their inner ends connected to the angular portions 11 of one jaw and outer ends connected to the bars 12 of the adjacent jaws so that the coiled springs at the ends of the jaw sections will act to normally urge the jaw sections towards each other.

The jaws also include chain sections 14 and chain sections 15, the chain sections 14 and 15 crossing each other at points throughout the lengths thereof, the ends of the sections being secured to the angle irons of which the jaws are formed.

The end sections 9 of the jaws are curved as clearly shown by Figure 2 of the drawings so that when the jaws move to their active positions, a space will be formed between the adjacent edges of the jaws providing a clearance to receive the foot or tail of an animal should the foot or tail of the animal be extending beyond the ends of the jaws, thereby insuring against injuring the animal.

An opening 16 is formed in the base 5 and accommodates the rod 17 that has one end thereof connected to the lever 18 that is pivotally supported on the base by means of the bracket 19. One end of the lever 18 extends downwardly and accommodates one end of the rod 20 which is received in the opening 21. The opposite end of the rod 20 has connection with the right angled portion 22 of the latch member 23 which is pivotally connected to the base, or depending flanges thereof at 24, the latch member including jaw engaging portions 25 that are adapted to overlie the angular portions 11 of the end sections of the jaws to hold the jaws against movement, when the trap is in a set position.

The rod 17 also connects with the trigger 26 that has jaw engaging portions 27 and as shown, it will be obvious that due to the construction and manner of supporting the rods 17 and 20 with respect to the lever 18, the latch members 23 and 26 will be moved, upon movement of the lever 18.

Pivotally mounted on the base is a trigger 28 which is designed to move over one end of the lever 18 when the trap is in a set position to hold the lever 18 against movement.

Thus it will be seen that when it is desired to set the trap, the lever 18 is moved downwardly, after the jaws have been moved to a position as shown by Figure 1 of the drawings, whereupon the latch members move over the right angled portions 11 of the jaw holding the jaws against the tension of the coiled springs 13.

When an animal enters the trap to obtain bait which has been conveniently placed therein, the trigger which is positioned in such a way that the animal will step thereon, is moved to a position as shown by Figure 3, to the end that the latch members disengage the right angled portions 11 of the jaw, releasing them and allowing the coiled springs 13 to swing the jaws upwardly, and form a housing around the animal.

Latch members indicated at 29 are provided on the jaws and are adapted to engage within the keepers 30 when the jaws are moved to their closed positions to hold the jaws against movement, and relieve the pivot pins of the jaws of undue strain, incident to an animal endeavoring to release himself after the jaws have been actuated.

I claim:—

1. A trap including a base, bracket members at the ends of the base, jaws including inwardly extended portions having right angled ends, said right angled ends having openings, bolts extending through the openings and having connection with the bracket members, said bolts providing supports for the jaws, latch members pivotally supported by the base and adapted to move into engagement with the right angled end portions to normally hold the jaws in their inactive positions, and coiled springs supported on the bolts and engaging the jaws for normally urging the jaws towards each other.

2. A trap including a base, bracket members at the ends of the base, jaws pivotally connected with the bracket members, coiled springs for normally urging the jaws to their active positions, latch members pivotally supported adjacent to the ends of the base and adapted to overlie portions of the jaws to normally hold the jaws in their inactive positions, a pivoted lever, rods connecting the lever and latch members, and a trigger adapted to engage the lever and normally hold the lever against movement.

In testimony that I claim the foregoing as my own, I have hereto affixed my signature in the presence of two witnesses.

FELIX H. CRAGO.

Witnesses:
W. L. MURPHY,
A. D. WHITLOCK.